US012208065B2

(12) United States Patent
Hoffman et al.

(10) Patent No.: US 12,208,065 B2
(45) **Date of Patent: *Jan. 28, 2025**

(54) CAP ASSEMBLY FOR A MEDICATION CONTAINER

(71) Applicant: Express Scripts Strategic Development, Inc., St. Louis, MO (US)

(72) Inventors: Robert E. Hoffman, Linden, IN (US); Timothy B. Clise, Howell, MI (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,426

(22) Filed: Oct. 27, 2023

(65) Prior Publication Data

US 2024/0058222 A1 Feb. 22, 2024

Related U.S. Application Data

(63) Continuation of application No. 17/728,605, filed on Apr. 25, 2022, now Pat. No. 11,833,113.

(60) Provisional application No. 63/179,831, filed on Apr. 26, 2021.

(51) Int. Cl.
*A61J 7/04* (2006.01)

(52) U.S. Cl.
CPC ........... *A61J 7/0436* (2015.05); *A61J 7/0418* (2015.05); *A61J 2200/30* (2013.01)

(58) Field of Classification Search
CPC ..... A61J 7/0436; A61J 7/0418; A61J 2200/30
See application file for complete search history.

(56) References Cited

U.S. PATENT DOCUMENTS

| | | | |
|---|---|---|---|
| 3,437,236 | A | 4/1969 | Huck |
| 3,620,413 | A | 11/1971 | Borsum |
| 3,823,844 | A | 7/1974 | Linkemer |
| 4,034,757 | A | 7/1977 | Glover |
| 4,432,300 | A | 2/1984 | Lyss |
| 4,460,106 | A | 7/1984 | Moulding, Jr. |

(Continued)

FOREIGN PATENT DOCUMENTS

| | | | |
|---|---|---|---|
| EP | 0252432 | A1 | 1/1988 |
| EP | 3762881 | A1 | 1/2021 |

(Continued)

OTHER PUBLICATIONS

Hoffman, U.S. Appl. No. 17/122,656—Cap Assembly for a Medication Container; filed Dec. 15, 2020.

*Primary Examiner* — Michael Collins
(74) *Attorney, Agent, or Firm* — Dickinson Wright PLLC

(57) ABSTRACT

The medication container includes a receptacle and a cap. The cap includes a gate that can be selectively opened to enable access to medications in the receptacle and closed to restrict access to medications in the receptacle. The gate has a locking mechanism that only unlocks to allow the gate to open from the closed position in response to an application of a downward force on a portion of the gate to resiliently deflect a portion of the gate. The cap further includes electronic components that are configured to monitor movement of medications through the cap and into and out of the receptacle, the electronic components including a memory that is configured to store data pertaining to such passages of medications.

20 Claims, 10 Drawing Sheets

(56) References Cited

U.S. PATENT DOCUMENTS

| | | | | |
|---|---|---|---|---|
| 4,489,834 | A | 12/1984 | Thackrey | |
| 4,971,221 | A | 11/1990 | Urquhart | |
| 5,259,532 | A | 11/1993 | Schwarzli | |
| 5,765,706 | A * | 6/1998 | Barker | A61M 15/0075 220/255 |
| 5,921,394 | A | 7/1999 | Shroff | |
| 5,934,492 | A | 8/1999 | Jones | |
| 6,098,835 | A | 8/2000 | Dejonge | |
| 6,108,588 | A | 8/2000 | McGrady | |
| 6,259,654 | B1 | 7/2001 | De La Huerga | |
| 6,332,100 | B1 | 12/2001 | Sahai | |
| 6,343,711 | B1 | 2/2002 | Coughlin | |
| 6,401,429 | B2 | 6/2002 | Aylward | |
| 6,651,840 | B1 | 11/2003 | Van Dullemen | |
| 6,655,707 | B2 | 12/2003 | Buckmiller | |
| 6,860,403 | B1 | 3/2005 | Mehrens | |
| 7,100,797 | B2 | 9/2006 | Kahn | |
| 7,213,721 | B2 | 5/2007 | Abdulhay | |
| 7,711,449 | B2 | 5/2010 | Abdulhay | |
| 7,719,927 | B1 * | 5/2010 | Robinson | A61J 7/0481 215/230 |
| 7,988,016 | B2 | 8/2011 | Klein | |
| 8,025,314 | B2 | 9/2011 | Adler | |
| 8,211,081 | B2 | 7/2012 | Brandenburger | |
| 8,269,613 | B2 | 9/2012 | Lazar | |
| 8,386,275 | B2 | 2/2013 | Chambers | |
| 8,388,907 | B2 | 3/2013 | Gold | |
| 8,666,539 | B2 | 3/2014 | Ervin | |
| 8,666,543 | B2 | 3/2014 | Macvittie | |
| 8,727,180 | B2 | 5/2014 | Zonana | |
| 8,955,058 | B2 | 2/2015 | Castro | |
| 8,963,710 | B2 | 2/2015 | Huang | |
| D723,793 | S | 3/2015 | Macvittie | |
| 9,021,981 | B2 | 5/2015 | Raiti De Boyles | |
| 9,056,700 | B2 | 6/2015 | Amin | |
| 9,195,822 | B2 | 11/2015 | Carlson | |
| 9,283,150 | B2 | 3/2016 | Bujalski | |
| D756,681 | S | 5/2016 | Macvittie | |
| 9,345,645 | B1 * | 5/2016 | Chernyak | A61J 7/0084 |
| 9,463,138 | B2 | 10/2016 | McClain | |
| 9,492,357 | B2 | 11/2016 | Macvittie | |
| 9,497,178 | B2 | 11/2016 | Chow | |
| 9,498,408 | B2 | 11/2016 | Lehmann | |
| 9,511,003 | B2 | 12/2016 | Medrano | |
| 9,516,008 | B2 | 12/2016 | Chow | |
| 9,527,084 | B2 | 12/2016 | Cox | |
| 9,554,969 | B2 | 1/2017 | Lehmann | |
| 9,622,939 | B2 | 4/2017 | Buxton-Dakides | |
| 9,713,574 | B2 | 7/2017 | Carrel | |
| 9,717,652 | B2 | 8/2017 | Geboers | |
| 9,730,860 | B2 | 8/2017 | Hamilton | |
| 9,731,103 | B1 | 8/2017 | Rouse | |
| 9,757,305 | B2 | 9/2017 | Ika | |
| 9,775,780 | B2 | 10/2017 | Afsarifard | |
| 9,872,808 | B2 | 1/2018 | Gipson | |
| 9,934,365 | B2 | 4/2018 | Turnell | |
| 9,981,116 | B1 | 5/2018 | Rouse | |
| 10,073,954 | B2 | 9/2018 | Chen | |
| 10,093,474 | B2 | 10/2018 | Littman | |
| 10,188,840 | B2 | 1/2019 | Rouse | |
| 10,196,197 | B2 | 2/2019 | Yeo | |
| 10,392,181 | B2 | 8/2019 | Zonana | |
| 10,399,725 | B2 | 9/2019 | Paz | |
| 10,441,509 | B2 | 10/2019 | Rouse | |
| 10,468,132 | B2 | 11/2019 | Kamen | |
| 10,470,976 | B2 * | 11/2019 | Warden | B65D 50/04 |
| 10,494,165 | B2 | 12/2019 | Sterns | |
| 10,555,873 | B2 | 2/2020 | Poirier | |
| 10,575,620 | B2 | 3/2020 | Arredondo | |
| 10,621,880 | B2 | 4/2020 | Boguraev | |
| 10,675,216 | B2 | 6/2020 | Mejia | |
| 10,722,431 | B2 | 7/2020 | Chen | |
| 10,729,860 | B1 | 8/2020 | Boyer | |
| 10,758,455 | B2 * | 9/2020 | Fisher | A61J 7/0084 |
| 10,792,226 | B2 | 10/2020 | Rouse | |
| 10,872,482 | B1 | 12/2020 | Colton | |
| 10,894,001 | B2 | 1/2021 | Jarvis | |
| 10,964,154 | B2 | 3/2021 | Einav | |
| 11,157,601 | B2 | 10/2021 | Miu | |
| 11,833,113 | B2 * | 12/2023 | Hoffman | A61J 7/0436 |
| 2001/0028308 | A1 | 10/2001 | De La Huerga | |
| 2005/0121407 | A1 * | 6/2005 | Hildebrandt | A61J 7/0481 215/230 |
| 2006/0138162 | A1 | 6/2006 | Anderson | |
| 2006/0213917 | A1 | 9/2006 | Handfield | |
| 2009/0294521 | A1 | 12/2009 | De La Huerga | |
| 2010/0142330 | A1 | 6/2010 | Reygaert | |
| 2011/0119090 | A1 | 5/2011 | Lazar | |
| 2011/0130696 | A1 | 6/2011 | Fritsch | |
| 2011/0272297 | A1 * | 11/2011 | Ziemba | B65D 55/12 206/1.5 |
| 2011/0301747 | A1 | 12/2011 | Chambers | |
| 2012/0003928 | A1 | 1/2012 | Geboers | |
| 2012/0138503 | A1 * | 6/2012 | Patel | B65D 65/46 206/524.7 |
| 2012/0257478 | A1 | 10/2012 | Marcellino | |
| 2013/0116818 | A1 | 5/2013 | Hamilton | |
| 2013/0161207 | A1 | 6/2013 | Luciano, Jr. | |
| 2013/0200033 | A1 * | 8/2013 | Zonana | B65D 83/0409 215/231 |
| 2013/0256331 | A1 | 10/2013 | Giraud | |
| 2013/0334165 | A1 | 12/2013 | McClain | |
| 2014/0305963 | A1 | 10/2014 | Zonana | |
| 2015/0053801 | A1 | 2/2015 | Smit | |
| 2015/0129602 | A1 | 5/2015 | Medrano | |
| 2015/0224028 | A1 * | 8/2015 | Carrel | A61J 1/22 604/407 |
| 2015/0291344 | A1 | 10/2015 | Macvittie | |
| 2015/0342830 | A1 | 12/2015 | Bujalski | |
| 2015/0360834 | A1 | 12/2015 | Mikhail | |
| 2016/0015885 | A1 | 1/2016 | Pananen | |
| 2016/0058670 | A1 | 3/2016 | Wheeler | |
| 2016/0107820 | A1 | 4/2016 | Macvittie | |
| 2016/0120758 | A1 | 5/2016 | Pi | |
| 2016/0147976 | A1 | 5/2016 | Jain | |
| 2016/0158470 | A1 | 6/2016 | Esteve | |
| 2016/0367188 | A1 | 12/2016 | Malik | |
| 2017/0049662 | A1 * | 2/2017 | Fisher | A61J 7/0084 |
| 2017/0079886 | A1 | 3/2017 | Sagynaliev | |
| 2017/0296432 | A1 | 10/2017 | Ika | |
| 2017/0316298 | A1 | 11/2017 | Chu | |
| 2017/0334631 | A1 | 11/2017 | Veltri | |
| 2018/0015002 | A1 | 1/2018 | Alaev | |
| 2018/0333860 | A1 | 11/2018 | Jamriska | |
| 2019/0133888 | A1 | 5/2019 | Lam | |
| 2019/0151605 | A1 | 5/2019 | McMenamin | |
| 2019/0156475 | A1 | 5/2019 | Markson | |
| 2019/0223792 | A1 | 7/2019 | Dhar | |
| 2019/0344953 | A1 * | 11/2019 | Trokhan | B65D 83/0427 |
| 2020/0252395 | A1 | 8/2020 | Mercier | |
| 2022/0127061 | A1 | 4/2022 | Hoffman | |
| 2022/0339071 | A1 * | 10/2022 | Gilreath | A61J 7/0076 |

FOREIGN PATENT DOCUMENTS

| | | | |
|---|---|---|---|
| WO | 199005684 | A1 | 5/1990 |
| WO | 2004103856 | A1 | 12/2004 |
| WO | 2005004786 | A1 | 1/2005 |
| WO | 2015157759 | A1 | 10/2015 |
| WO | 2016061462 | A2 | 4/2016 |
| WO | 2016127051 | A1 | 8/2016 |

* cited by examiner

FIG. 8A
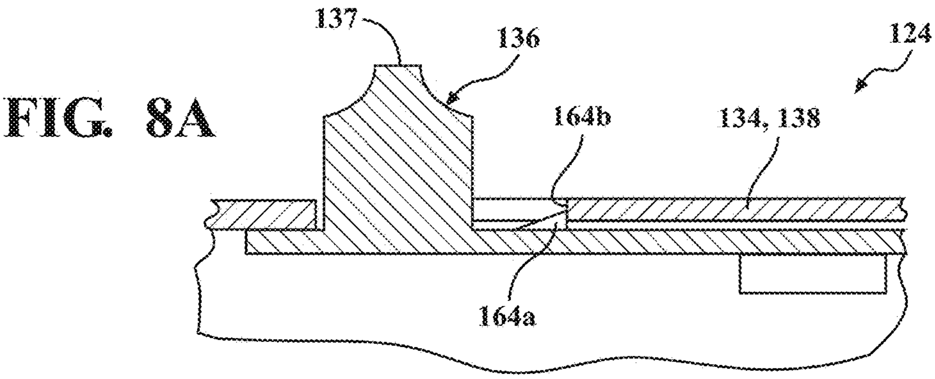
FIG. 8B
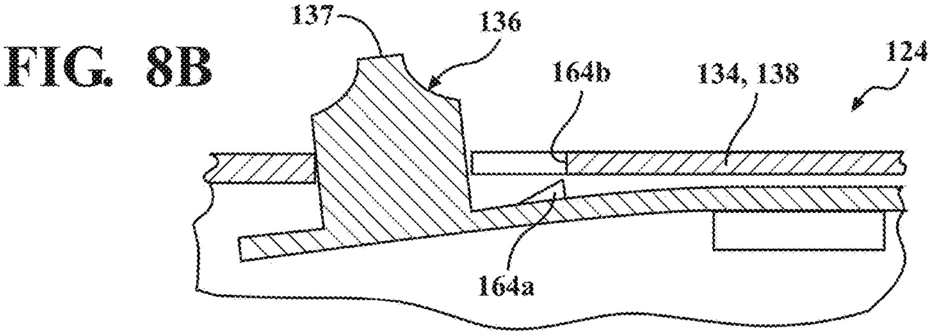
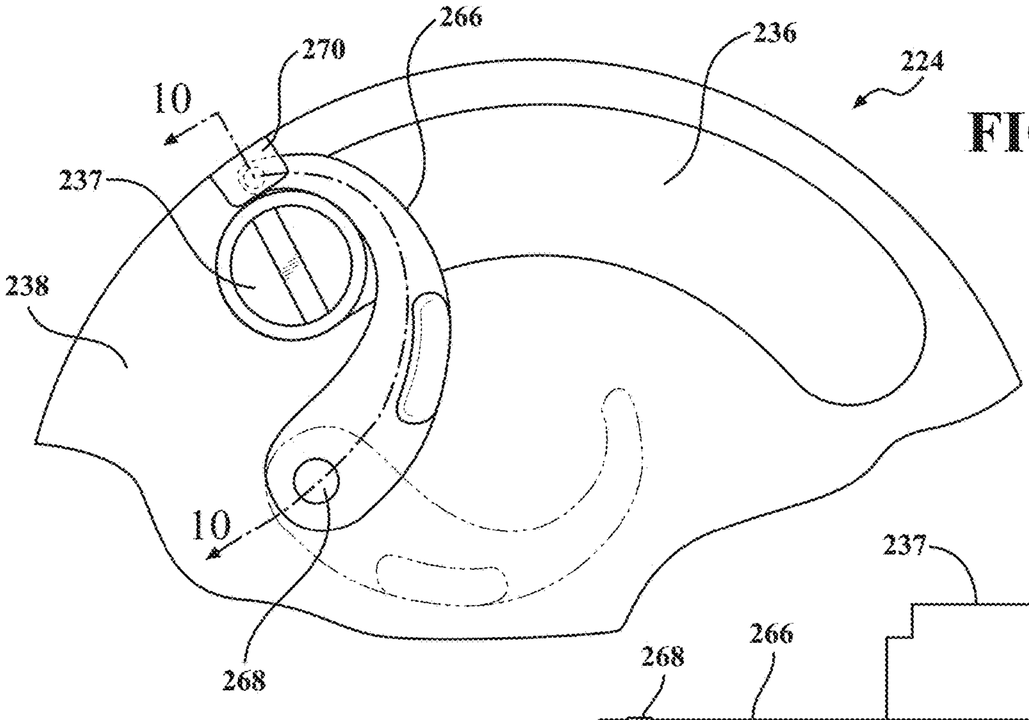
FIG. 9
FIG. 10
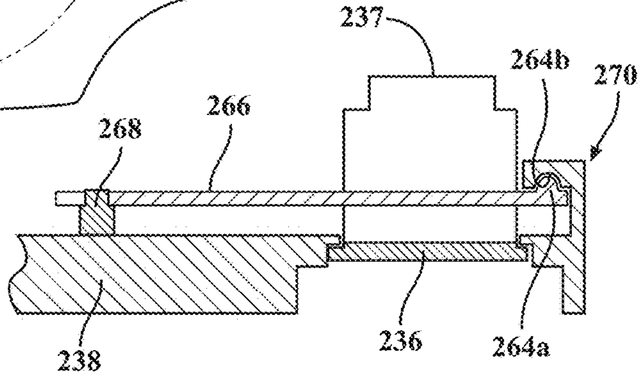

CAP ASSEMBLY FOR A MEDICATION CONTAINER

CROSS-REFERENCE TO RELATED APPLICATION

This application is a continuation of U.S. patent application Ser. No. 17/728,605 filed Apr. 25, 2022 and claims priority to U.S. Provisional Patent Application No. 63/179,831, filed on Apr. 26, 2021, and entitled "CAP ASSEMBLY FOR A MEDICATION CONTAINER." The entire disclosures of the above applications are herein incorporated by reference.

FIELD

The subject disclosure is generally related to medication containers and, more particularly, to a cap assembly for a medication container.

BACKGROUND

Medication compliance by patients is a known problem in the medical industry because patients often, either intentionally or accidentally, fail to follow a medication regimen prescribed by a medical provider. In some cases, as little as a single missed dose may require a patient to restart a medication regimen from the beginning. One known product which seeks to improve medication compliance, includes a plurality of packets, each of which contains only the medications that the user has to take at a certain time. In other words, the pills are divided, not by type, but by when they should be taken. However, there remains a continuing need for a product that is can improve medication compliance and which is both more convenient and less costly than other known solutions.

SUMMARY

One aspect of the present disclosure is related to a medication container that includes a receptacle and a cap. The cap includes a gate that can be selectively opened to enable access to medications in the receptacle and closed to restrict access to medications in the receptacle. The gate has a locking mechanism that only unlocks to allow the gate to open from the closed position in response to an application of a downward force on a portion of the gate to resiliently deflect a portion of the gate. The cap further includes electronic components that are configured to monitor movement of medications through the cap and into and out of the receptacle, the electronic components including a memory that is configured to store data pertaining to such passages of medications.

According to another aspect of the present disclosure, the electronic components include a processor and a wireless module that is configured to communicate with an external device to transmit data between the cap and the external device.

According to yet another aspect of the present disclosure, the gate includes an upwardly extending button and wherein pressing the button causes the gate to resiliently deflect to unlock the locking mechanism.

According to still another aspect of the present disclosure, the locking mechanism includes at least one projection on the gate or the cap and at least one detent on the other of the gate and the cap. Pressing the button of the cap deflects the gate to disengage the at least one projection from the at least one detent.

According to a further aspect of the present disclosure, the at least one detent is at least one opening formed in the cap and the at least one projection is on the gate. When the gate is in the closed position, the at least one projection on the gate is received in the at least one opening in the cap.

According to yet a further aspect of the present disclosure, the locking mechanism includes a swinging lock that is pivotably coupled with the cap and that can swing between an unlocked position and a locked position, When the swinging lock is in the locked position, a projection on one of the swinging lock and a latch on the cap is received within a detent on the other of the swinging lock and the cap. Pressing the swinging lock deflects the swinging lock to disengage the projection from the detent and allow the swinging lock to move to the unlocked position.

According to still a further aspect of the present disclosure, when swinging lock is in the locked position, the swinging lock engages with an upwardly projecting button of the gate to hold the gate in the closed position.

According to another aspect of the present disclosure, the locking mechanism includes a bridge that extends across a passage in the cap. The gate includes an upwardly projecting button, when the gate is in the closed position, the bridge engages the button of the gate to hold the gate in the closed position, and wherein the button can be pressed to deflect the gate and allow the button to pass underneath the bridge.

Another aspect of the present disclosure is related to a cap assembly for a medication container. The cap assembly includes a cap body that is configured to be attached with a receptacle and that has a passage. A gate is operably coupled with the cap body and able to slide between a closed position, which restricts movement of pills through the cap assembly, and an open position, which allows pills to move through the cap assembly. The cap assembly further includes a locking mechanism that cooperates with the gate and only unlocks to allow the gate to open from the closed position in response to an application of a downward force on a portion of the gate or a component of the locking mechanism to resiliently deflect a portion of the gate. Electronic components are provided to monitor movement of medications through the cap and into and out of the receptacle wherein the electronic components include a memory that is configured to store data pertaining to such passages of medications.

According to another aspect of the present disclosure, the electronic components include a processor and a wireless module that is configured to communicate with an external device to transmit data between the cap and the external device.

According to yet another aspect of the present disclosure, the gate includes an upwardly extending button, and pressing the button causes the gate to resiliently deflect to unlock the locking mechanism.

According to still another aspect of the present disclosure, the locking mechanism includes at least one projection on the gate or the cap and at least one detent on the other of the gate and the cap. Pressing the button of the cap deflects the gate to disengage the at least one projection from the at least one detent.

According to a further aspect of the present disclosure, the at least one detent is at least one opening formed in the cap body, and the at least one projection is on the gate. When the gate is in the closed position, the at least one projection on the gate is received in the at least one opening in the cap body.

According to yet a further aspect of the present disclosure, the locking mechanism includes a swinging lock that is pivotably coupled with the cap body and that can swing between an unlocked position and a locked position. When the swinging lock is in the locked position, a projection on one of the swinging lock and a latch on the cap body is received within a detent on the other of the swinging lock and the cap body. Pressing the swinging lock deflects the swinging lock to disengage the projection from the detent and allow the swinging lock to move to the unlocked position.

According to still a further aspect of the present disclosure, when the swinging lock is in the locked position, the swinging lock engages with an upwardly projecting button of the gate to hold the gate in the closed position.

According to another aspect of the present disclosure, the locking mechanism includes a bridge that extends across the passage in the cap body. The gate includes an upwardly projecting button, and when the gate is in the closed position, the bridge engages the button to hold the gate in the closed position. The button can be pressed to deflect the gate and allow the button to pass underneath the bridge.

Yet another aspect of the present disclosure is related to a method of accessing medication in a medication container. The method includes the step of preparing a receptacle and a cap. The cap includes a gate that can be selectively opened to enable access to medications in the receptacle and closed to restrict access to medications in the receptacle. The cap also includes a locking mechanism that can lock the gate in the closed position. The method continues with the step of pressing on a portion of the gate to resiliently deflect the portion of the gate and unlock the locking mechanism. The method proceeds with the step of, with the locking mechanism unlocked, opening the gate.

According to another aspect of the present disclosure, the method further includes the step of storing data related to each dispensing event in a memory in the cap.

According to yet another aspect of the present disclosure, the step of pressing on a portion of the gate includes pressing on an upwardly projecting button on the gate to resiliently deflect the gate and disengage a projection on the gate or the cap from a detent on the other of the gate and the button.

According to still another aspect of the present disclosure, the step of pressing a portion of the gate includes pressing on a swinging lock to open the locking mechanism.

BRIEF DESCRIPTION OF THE DRAWINGS

These and other features and advantages of the present disclosure will be readily appreciated, as the same becomes better understood by reference to the following detailed description when considered in connection with the accompanying drawings wherein:

FIG. 8A is a cross-sectional view of a cap assembly that includes a second exemplary embodiment of the safety mechanism and showing the gate in a closed position;

FIG. 8B is another cross-sectional view of the cap assembly that includes the second exemplary embodiment of the safety mechanism and showing the gate being deflected so that it can be opened;

FIG. 9 is a top elevation view of an exemplary cap assembly including a third exemplary embodiment of the safety mechanism;

FIG. 10 is a cross-sectional view of the safety mechanism of FIG. 9;

FIG. 17 is a schematic view of the medication container and an environment it can operate in.

DESCRIPTION OF THE ENABLING EMBODIMENTS

Figure 1:
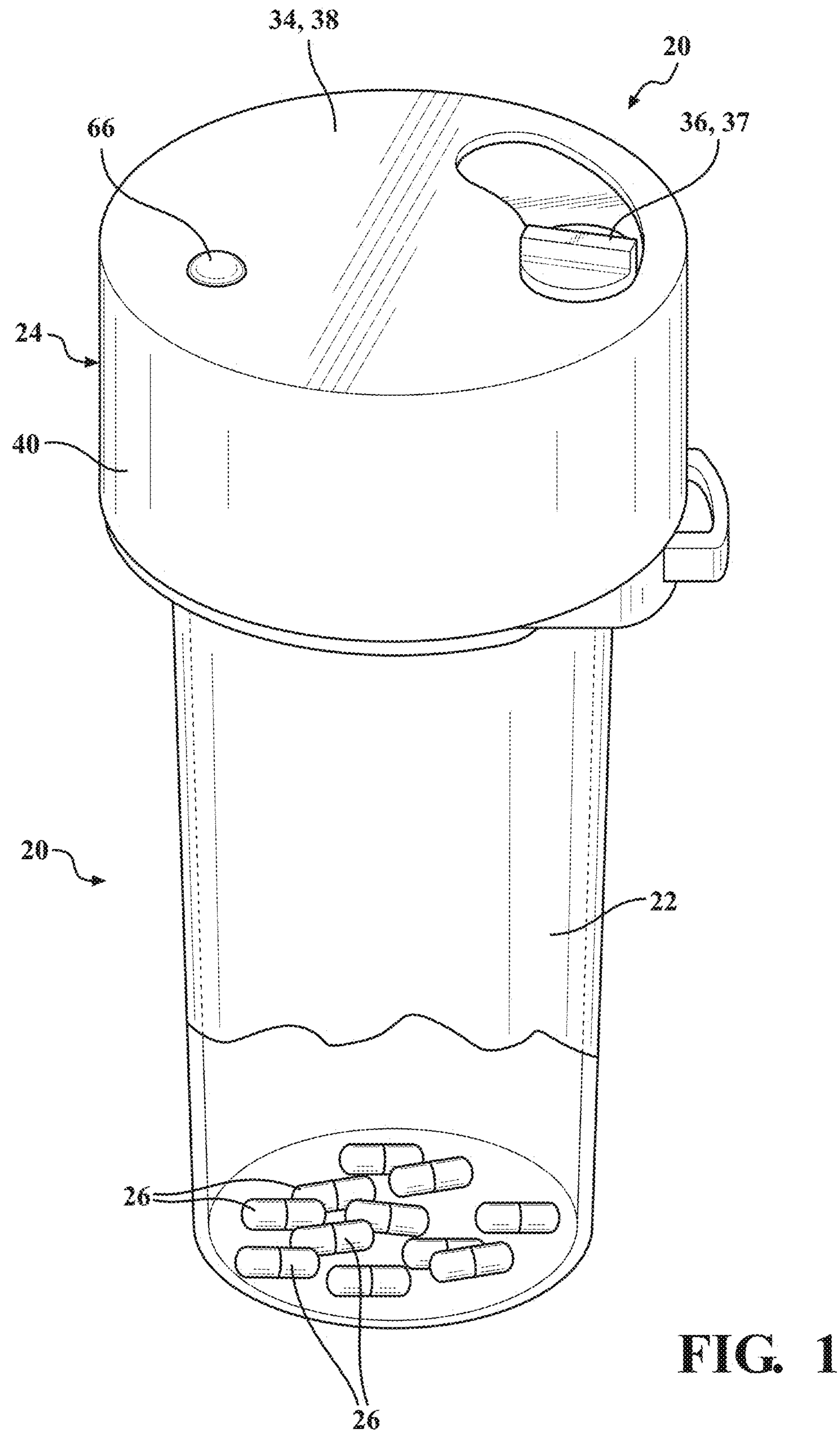
FIG. 1 is a perspective view of a first embodiment of a medication container constructed according to one aspect of the present disclosure.
Figure 2:
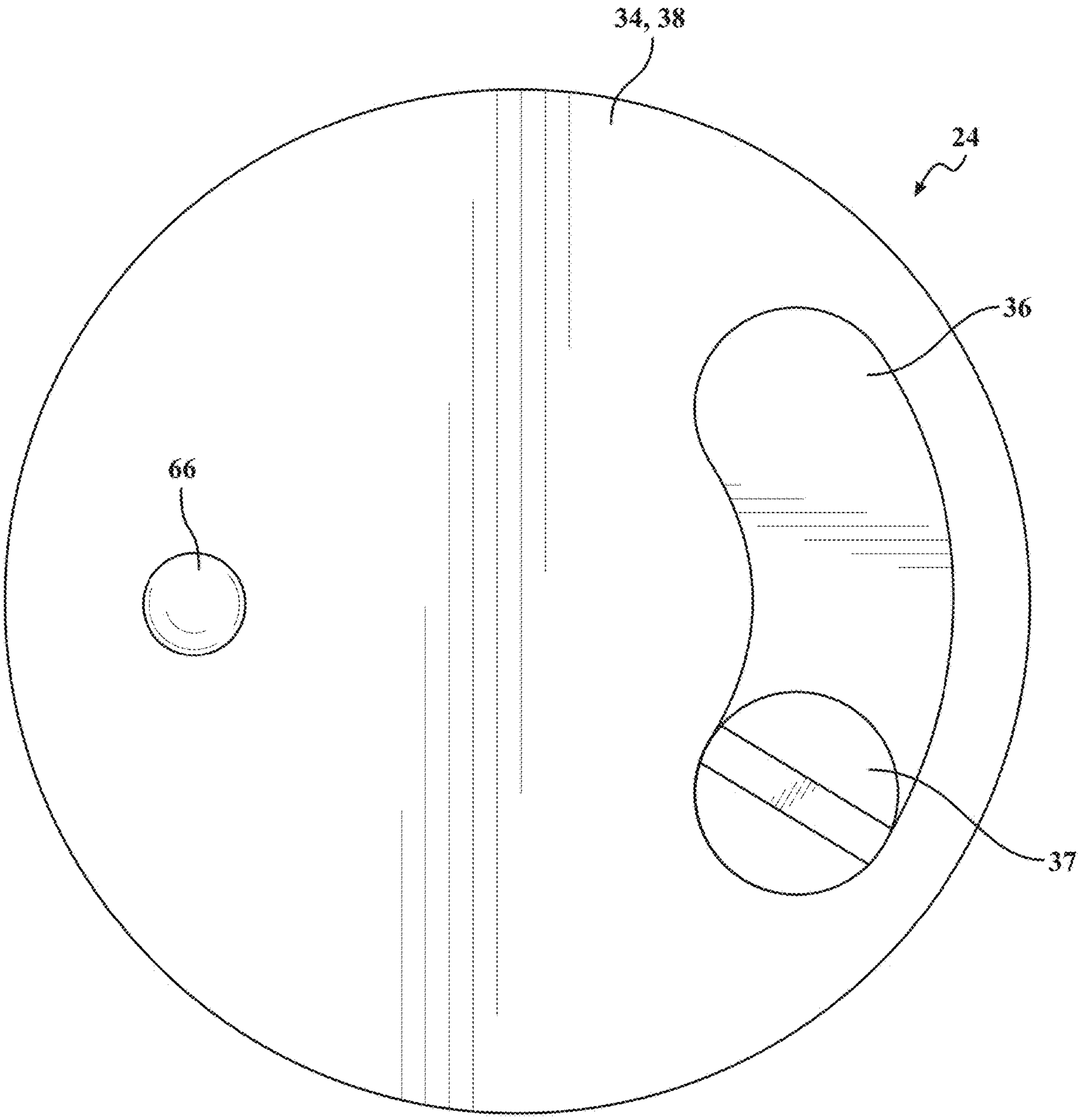
FIG. 2 is a top elevation view of the medication container of FIG. 1.

Referring to the Figures, wherein like numerals indicate corresponding parts throughout the several views, the subject disclosure includes a smart medication container 20 that has an improved security mechanism to restrict access to the contents of the container 20. In the exemplary embodiment, the medication container 20 is “smart” in that it includes certain electronic components that monitor a patient’s adherence to their medication schedule are highly effective at improving a user’s compliance of a medication schedule. The medication container 20 includes a receptacle 22 and a cap assembly 24 with the electronic components being at least partially disposed in the cap assembly 24. Unlike conventional cap assemblies that are removed from the receptacle to allow the patient (hereinafter referred to frequently as the "user") to access medications contained in the medication container, the cap assembly 24 is to remain fixedly attached with the receptacle 22 but has a door or gate 36 that can open to permit access to the medications contained in the receptacle 22. As discussed in further detail below, the cap assembly 24 includes a safety mechanism that is configured to hold this door or gate 36 in a closed position to prevent unintentional access to the pills contained in the receptacle 22.

The aforementioned electronic components of the cap assembly 24 are configured to monitor the passage of medications 26 in the form of pills 26 out of the receptacle 22 and to store internally and transmit information pertaining to each dispensing event to at least one external device 25. The external device 25 may be a computing device, such as a smart phone, a computer, a server, or the like. The transmission of data relating to dispensing can be sent either wirelessly or via a wired connection. The wireless transmission can be either direct or via the internet 27. The external device 25 may be controlled either by the patient, by a medical provider, a pharmacy, a pharmacy benefit provider, or combinations thereof. The external device 25 can include a display to display for its user an easy to access log of all dispensing events, including time stamps and quantities of pills 26 dispensed or graphics related to pills 26 dispensed from the receptacle 22. The graphics can be triggered by a flag value stored in memory for the prescribed dosing regimen for the patient and the medication 26. Thus, the medication container 20 improves medication compliance (e.g., adherence) by helping the user avoid either missing medication doses, taking medication at the wrong time, or taking double doses of medication. In an embodiment where a medical provider is provided with access to the log of dispensing events, the medical provider may be able to better diagnose or otherwise treat a patient's illness with the full knowledge of how well that patient is conforming to his or her medication schedule. The use of the word pills 26 herein is intended to cover any suitable types of solid medications, including capsules, tablets, or the like.

Figure 3:
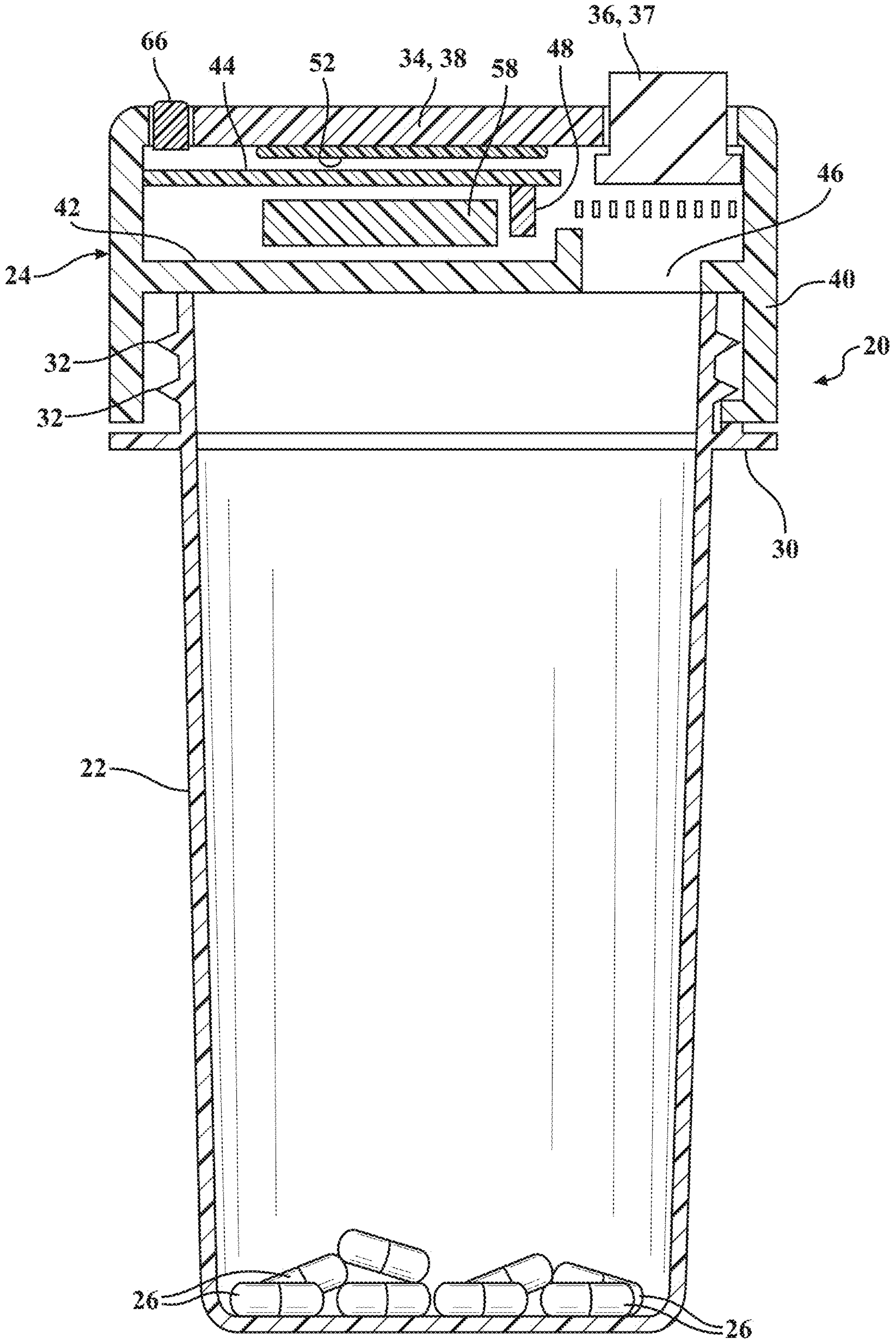
FIG. 3 is a cross-sectional view of the medication container of FIG. 1.

As shown in FIGS. 1 and 3, the receptacle 22 is cup-shaped and has a single inner space (storage void) which extends from a closed end (sometimes referred to as the bottom) to an open end (sometimes referred to as the top). An outer wall extends upwardly from the closed end to define the inner space. Adjacent the open end of the inner space, an outer surface of the receptacle 22 defines a radially outwardly extending flange 30 (sometimes also known as a bead) and a pair of circumferential ribs 32. The circumferential ribs 32 are configured to engage with the cap assembly 24 to retain the cap assembly 24 on the receptacle 22. In some embodiments, the ribs 32 can be annular in shape and the cap assembly 24 can be pressed into a snap-fitting engagement with the ribs 32. In some other embodiments, the ribs 32 can be a continuous thread that extends twice or more around the circumference of the top of the outer wall and the cap assembly 24 has a corresponding thread that can engage the ribs 32 to establish the connection between the receptacle 22 and the cap assembly 24. In some embodiments, other connection means can be employed to attach the cap assembly 24 with the receptacle 22. In some embodiments, the cap assembly 24 can be non-detachably locked with the receptacle 22 such that the medication container 20 is non-refillable by the user. In some other embodiments, the cap assembly 24 can be detached from the receptacle 22 by the user so that the receptacle 22 can be refilled with pills 26.

In the exemplary embodiment, the receptacle 22 is in the form of a vial, which allows for improved efficiency when initially filling the receptacle 22 with pills 26. However, in alternate embodiments, the receptacle 22 could be a bottle. The receptacle 22 is preferably made of a monolithic piece of a durable plastic material and may be shaped through, for example, an injection molding operation. An outer surface of the receptacle 22 may include indicia (such as on a label) that identifies the type of pills 26 contained in the receptacle 22 and also provides dosage instructions. The label may further include instructions on how to use the cap assembly 24 to dispense pills 26 without removing the cap assembly 24 from the receptacle 22 in a process that is discussed in further detail below. The label may further include a machine-readable code for directing a user's electronic device to instructions for using the cap assembly 24 and can link the cap assembly 24 to the user's account.

In a first exemplary embodiment, the cap assembly 24 includes a cap 34; a gate 36; and a plurality of electrical components (discussed in further detail below) for monitoring the passage of the pills 26 into and out of the receptacle 22. The cap 34 has a generally planar or slightly curved top (outer) wall 38 and a cylindrically-shaped outer wall 40 that is in a snap-fitting engagement with the ribs 32 of the receptacle 22 to retain the cap assembly 24 on the receptacle 22. In the exemplary embodiment, the cap 34 has a diameter of forty-five millimeters (45 mm) and preferably has an environmental seal that can seal the cap assembly 24 against the receptacle 22 to retard entry of moisture, light, and air from entering the inner space of the receptacle 22. In some embodiments, the cap 34 could have different sizes, such as thirty-eight millimeters (38 mm). The cap 34 is preferably made of a polymeric material (such as plastic) and can be shaped through an injection molding operation.

As shown in FIG. 3, the cap 34 further includes an inner wall 42 that is spaced from and parallel with the top wall 38 to define an electronics chamber within the cap 34 between the top and inner walls 38, 42. In an exemplary embodiment, the inner wall 42 is monolithic with the planar top wall 38 and the cylindrical outer wall 40 of the cap 34. An electronics substrate 44, such as a printed circuit board (PCB), which contains or is otherwise in electrical communication with the aforementioned electrical components, is disposed within the electronics chamber and is fixedly attached with the cap 34. In one embodiment, the electronics substrate 44 is formed within the inner wall 42. In some embodiments, the inner wall is made as a separate piece from the remainder of the cap and the electronics substrate is coupled to the inner wall to form a pre-assembled unit which is then joined with and sealed against the cap to assist. In other embodiments, the electronics substrate itself serves as the inner wall and is sealed against the cylindrical outer wall of the cap and the space between the electronics substrate and the top wall of the cap defines the electronics chamber.

The top wall 38 and the inner wall 42 of the cap 34 have aligned openings to define a single passage 46 for guiding the pills 26 from the receptacle 22, through the cap assembly 24, and out of the medication container 20. In an example embodiment, the passage 46 has an annulus sector shape. In some embodiments, the passage has other shapes, e.g., a circular shape, an elliptical shape, a rectangular shape, etc.

Figure 4:
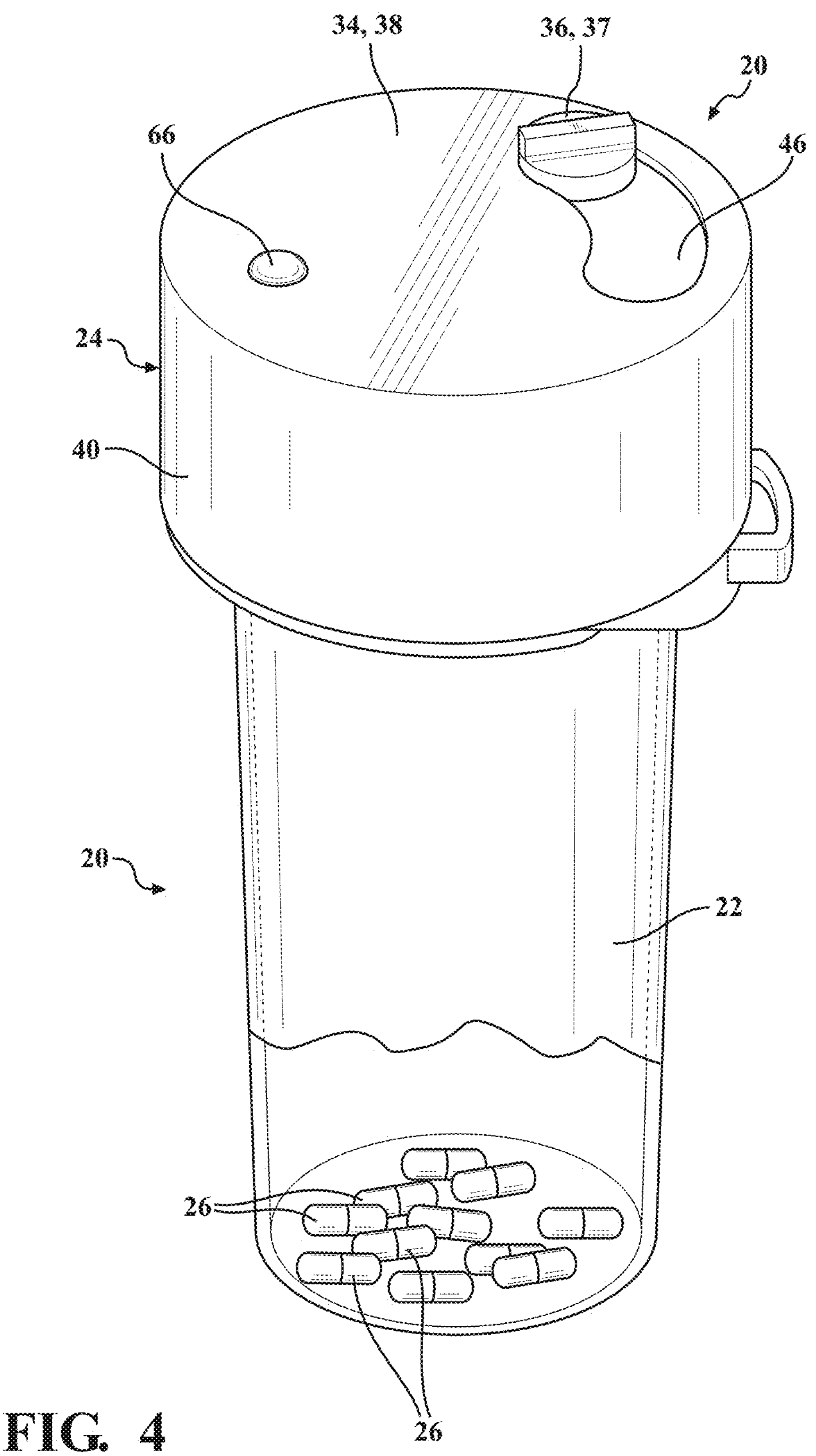
FIG. 4 is a perspective view of the medication container of FIG. 1 and showing a gate of a cap assembly in an open position.

The gate 36 is slidably coupled with the cap 34 and is movable from an open position (shown in FIG. 4) to a closed position (shown in FIG. 1) and vice versa. When the gate 36 is in the open position, the pills 26 in the receptacle 22 can freely travel through the passage 46 out of the medication container 20 or pills 26 can be added into the medication container 20. On the other hand, when the gate 36 is in the closed position, the passage 46 is closed and pills 26 cannot get into or out of the medication container 20. In an example embodiment, the gate 36 has a button 37, which projects above the top wall 38 of the cap 34 so that a user can manually engage the gate 36 and slide the gate 36 between the open and closed positions. The manual control of the gate 36 allows a user to still be able to access the pills 26, even in the event of a failure of the electrical components of the cap assembly 24. In some embodiments, the gate may be electronically, rather than manually, opened and closed. For example, an electrical motor or solenoid, powered from an electrical power source, can operate the gate to move it from a closed position to an open position.

As discussed in further detail below, according to an aspect of the present disclosure, the gate 36 includes a security mechanism that is configured to prevent unintentional opening of the gate 36 or opening of the gate 36 by, for example, a child. In an embodiment, the gate 36 is preferably guided in its movement between the open and closed positions by a pair of rails that project downwardly from the top wall 38 of the cap 34.

In one embodiment, the gate 36 is limited to only open by a certain amount based on a size of the pills 26 contained in the receptacle 22 to limit the rate that pills 26 can be dispensed from the medication container 20. In other words, for medication containers 20 containing larger pills 26 and/or for medication containers 20 where a dose includes multiple pills 26, the gate 36 can open more than in medication containers 20 containing smaller pills 26 or containing pills 26 that are to be taken one at a time.

In an example embodiment, the electrical components include a plurality of medication sensors 48 (in some embodiments, only a single medication sensor 48 may be included), an accelerometer 50, a wireless module 52, a processor (such as a microprocessor 54), a memory 56, and a battery 58. These different electrical components could be separate from or packaged along with one another. The medication sensors 48 are located adjacent to the passage 46 for detecting pills 26 traveling either into or out of the receptacle 22 in a contactless manner, i.e., the pills 26 do not have to touch the medication sensors 48 for the medication sensors 48 to be triggered and for the cap assembly 24 to register the event as a dispensing event. Thus, the medication sensors 48 do not include any moving parts that require contact from the pills 26 to detect dispensing. In some embodiments, the inner wall 42 may be removable or may be able to open or close in order to allow the battery 58 to be replaced when depleted.

In one embodiment, each medication sensor 48 includes an emitter, e.g., a light source 60, and a detector 62 for detecting reflected light from the light source 60. The light source 60 is a light emitting diode (LED), which is configured to emit light in the infrared wavelength band, in an example embodiment. In an example embodiment, the wavelength of light emitted from the light source 60 is greater than six hundred and twenty-two nanometers (622 nm). However, other types of light sources that emit light with different wavelengths may alternately be employed.

Figure 5:
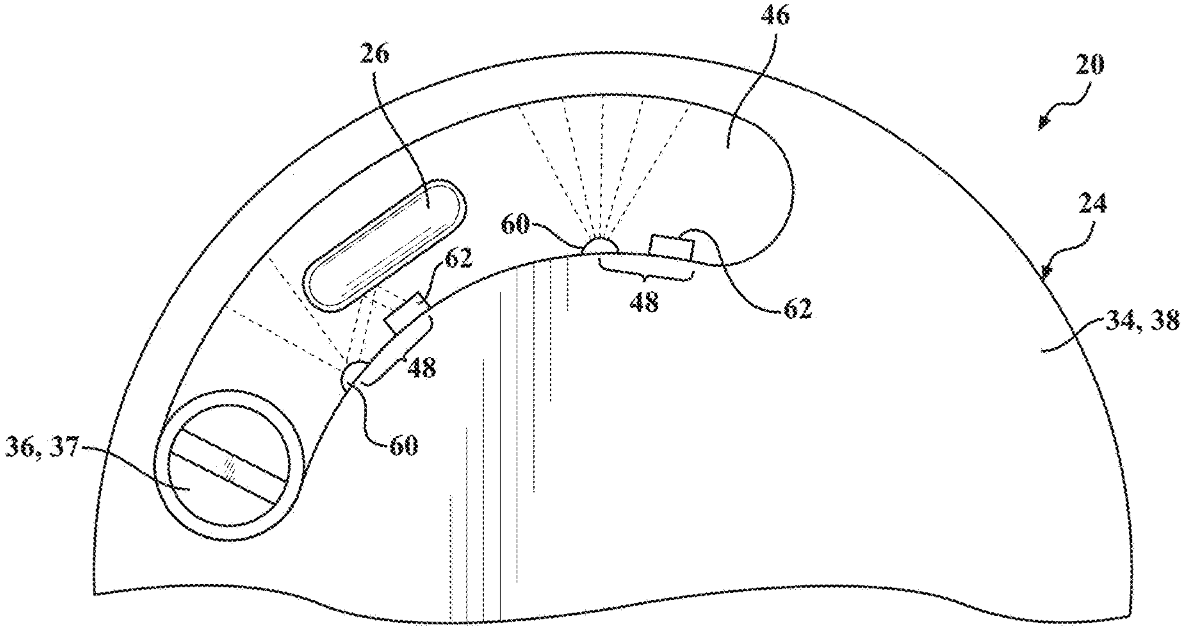
FIG. 5 is an enlarged and fragmentary view of the cap assembly and showing a medication being dispensed out of the medication container of FIG. 1.

As shown in FIG. 5, each light source 60 is directed to project light in a direction towards an opposite wall of the passage 46, e.g., through a lens or collimator, which can be mounted to an inwardly, opening in facing wall of the cap 34. Each light detector 62 can be a photodiode, which responds to a change in light, such as by generating a voltage or another signal, when light is projected on a surface of the photodiode. The light detector 62 can communicate this voltage (or other signal) to the microprocessor 54, which can use this information to determine if a dispensing event occurred. Depending on the type of pills 26 (specifically, their color, reflectivity, and transparency) contained in the receptacle 22, the opposite wall of the passage 46 may be white, black, reflective, or colored such that the light detectors 62 generate a baseline voltage when the passage 46 is empty.

In operation, when a pill 26 travels through the passage 46 either into or out of the medication container 20, some of the light emitted by one of the light sources 60 reflects off of the pill 26 and back to one of the light detectors 62, thereby changing the voltage produced by that light detector 62. The magnitude of this voltage change will depend, inter alia, on the baseline voltage when the passage 46 is empty and the color and reflectivity of the pill 26. The microprocessor 54 is pre-programmed to recognize the certain voltage changes as being associated with the pills 26 of the medication container 20 and to program into the memory 56 data associated with each event in which that voltage change is detected.

In an embodiment, the plurality of medication sensors may include multiple medication sensors that are spaced apart from one another along the direction of extension passage. By arranging the medication sensors in this manner, a direction of travel of the pills through the passage (into the container or out of the container) can be determined based on which medication sensors are tripped first, i.e., the one(s) nearest the receptacle or the one(s) nearest the gate. In another embodiment, the medication sensors can be arranged at angles relative to one another (such as in an L-shaped arrangement) so that pill positioning in the receptacle adjacent the passage and singulation within the passage can be detected. In an example, at least one of the sensors faces (and senses) in different direction than other ones of the sensors.

The data that is saved into the memory 56 following a dispensing event preferably includes a time stamp and a quantity of pills 26 detected and dispensed out of the passage 46. Other data that may be saved into the memory 56 includes a temperature at the time of dispensing (if the cap assembly further includes a temperature sensor) and remaining battery capacity information. The fact that the cap assembly 24 only records a dispensing event when the correct voltage change is detected reduces false positives and improves accuracy of the data saved into the memory 56. The microprocessor 54 may also be configured to record data into the memory 56 when non-dispensing events occur, such as if the gate 36 is opened but no pill 26 is detected in the passage 46. In one embodiment, data is recorded onto the memory 56 each time the gate 36 is opened for more than a predetermined time threshold (such as two seconds).

Further details pertaining to various features of the cap assembly 24 and pertaining to operation of the cap assembly to improve medication compliance are described in U.S. patent application Ser. No. 17/122,656, filed on Dec. 15, 2020, and entitled "CAP ASSEMBLY FOR A MEDICATION CONTAINER," which is incorporated herein by reference. Additional cap assembly improvements that can be used or combined with the present disclosure are described in Ser. No. 17/570,759, filed on Jan. 7, 2022, and entitled "CAP ASSEMBLY FOR A MEDICATION CONTAINER," which is incorporated herein by reference.

The following discussion relates to the security mechanism that is incorporated into the cap assembly 24 to prevent unintentional opening of the gate 36 and to prevent unwanted persons, such as children, from accessing the pills 26 contained therein.

Figure 6:
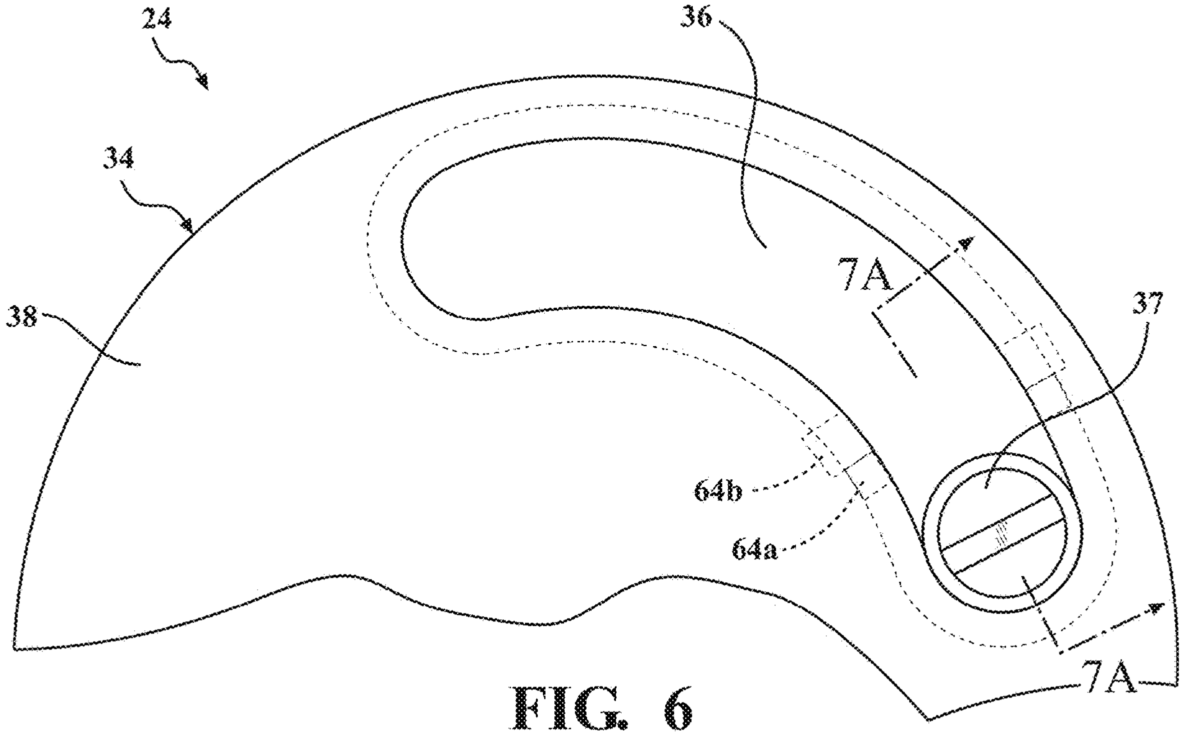
FIG. 6 illustrates an exemplary cap assembly including a first exemplary embodiment of a safety mechanism.
Figure 7A:
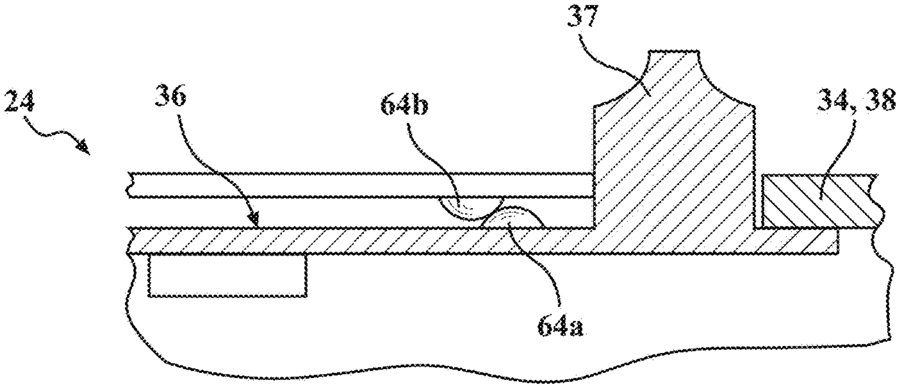
FIG. 7A is a cross-sectional view of a gate portion of the cap assembly of FIG. 6 and showing the gate in a closed position.
Figure 7B:
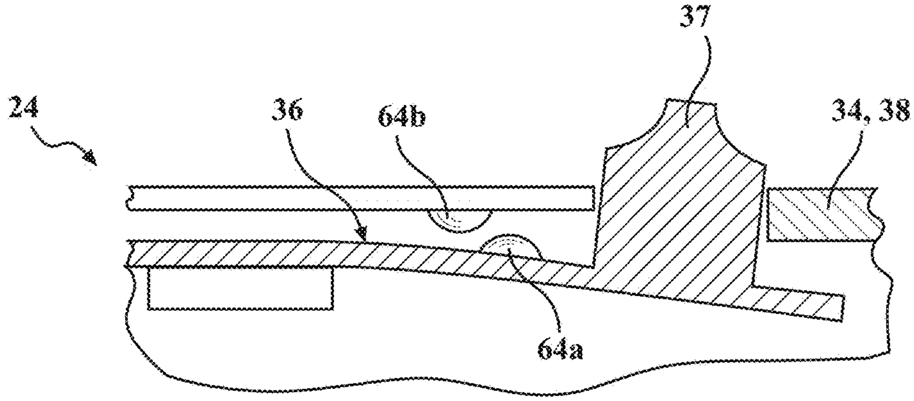
FIG. 7B is another cross-sectional view of the gate portion and showing the gate being deflected so that it can be opened.

Referring now to FIGS. 6, 7A, and 7B, a first exemplary embodiment of the security mechanism is shown. As indicated with broken lines, in this embodiment, the gate 36 has a width which is greater than a width of the passage 46 such that there is an overlapping area where the gate 36 overlaps with the top wall 38 of the cap 34 on opposite sides of the passage 46. The gate 36 and the cap 34 are provided with cooperating restriction devices 64*a*, 64*b* that cooperate with one another to only allow the gate 36 to move from the closed position when the proper action is applied to the gate 36. For example, in this embodiment, the cooperating restriction devices include a pair of projections 64*a* that are formed into the gate 36 and a pair of detents in the form of projections 64*b* that are formed into the cap 34 and that contact one another within the overlapping area when the gate 36 is in the closed positions, as shown in FIG. 7A. More specifically, the projections 64*a* are formed into a top surface of the gate 36 and project upwardly towards a lower surface of the top wall 38 of the cap 34, and the projections 64*b* project downwardly from the lower surface of the top wall 38 of the cap 34. The projections 64*a*, 64*b* are preferably located adjacent the distal end of the gate to allow the projections 64*a*, 64*b* to be more easily separated from one another in response to a downward force being applied to the end of the gate 36 to resiliently deflect the gate 36 in a spring-like fashion as shown in FIG. 7B, thereby allowing the gate 36 to be slid away from the closed position towards the open position. However, in some embodiments, the projections 64*a*, 64*b* may be spaced a distance from the end of the gate. In some embodiments, rather than two sets of projections, either the gate or the top wall of the cap can include dimples that can receive the projections to lock the gate in the closed position.

Due to their locations in the overlapping area between the gate 36 and the top wall 38 of the cap 34, the projections 64*a*, 64*b* are not readily visible from outside of the cap 34. The projections 64*a*, 64*b* are preferably rounded to prevent the projections 64*a*, 64*b* from getting caught with one another, thereby allowing easy opening of the gate 36 so long as sufficient downward pressure is applied on the gate 36 to separate the projections 64*a*, 64*b* from one another. Thus, the opening process is very simple in that the user simply presses downwardly on the button 37 to deflect the projections 64*a* on the gate 36 out of engagement with the projections 64*b* on the cap 34 so that the user can slide the gate 36 from the closed position to the open position. Depending on the shapes of the projections 64*a*, 64*b*, pressing the button 37 may or may not be required to slide the gate 36 from the open position to the closed position.

In some embodiments, the cap 34 may include multiple sets of projections 64*b* that are spaced apart from one another for retaining the gate 36 in different partially open positions. This can allow the user to only open the gate 36 by a limited amount based on the size of the pills in the receptacle and on the number of pills in each dose according to the user's medication schedule.

In some embodiments, the projection or projections can project laterally rather than vertically. In such embodiments, the projections on the cap may be formed into the rails that guide the movement of the gate rather than into the top wall of the cap.

Referring now to FIGS. 8A and 8B, a second exemplary embodiment of the security mechanism is shown with like numerals, separated by a prefix of "1" identifying like components with the embodiment described above. In this embodiment, the cooperating restriction devices can include at least one projection 164*a* formed into either the gate 136 and a correspondingly shaped recess or opening 164*b* formed into the top wall 138 of the cap 134. As shown in FIG. 8A, when the gate 136 is properly located in the closed position, the projection 164*a* extends into the recess or opening 164*b* to lock the gate 136 in the closed position. As shown in FIG. 8B, a sufficient downward force can be applied to the gate 136 to deflect the gate 136 and separate the at least one projection 164*a* from the at least one recess or opening 164*b*, thereby allowing the gate 136 to be slid from the closed position towards the open position. When opened, the gate 136 remains in the deflected condition until the projection 164*a* reaches the opening 164*b*, at which point, the gate 136 springs upwardly to engage the projection 164*a* with the opening 164*b* and lock the gate 136 in the closed position.

Referring now to FIGS. 9 and 10, a third exemplary embodiment of the security mechanism is shown with like numerals, separated by a prefix of "2," identifying like components with the embodiments described above. In this embodiment, the gate 236 includes a swinging lock 266 that is engaged with an outer surface of the top wall 238 of the cap 234 and that can articulate about an axis between an unlocked position (shown in dashed lines) and a locked position (shown in solid lines). The axis may be a pin 268 that projects upwardly from a top surface of the top wall 238. A latch 270 is positioned on an opposite side of the gate 236 from the pin 268 to hold the swinging lock 266 in the locked position. When the swinging lock 266 is in the locked position, it directly contacts the button 237 on the gate 236 to retain the gate 236 in the closed position, i.e., to prevent movement of the gate 236. When the swinging lock 266 is in the unlocked position, it does not interact with the gate 236, and thus, the gate 236 is free to be opened and closed freely by the user.

The latch 270 is generally L-shaped with a first leg that extends vertically upwardly from the top wall 238 of the cap 234 and a second leg that extends perpendicularly from the first leg and overlies a portion of the top wall 238. The second leg has a downwardly facing recess or detent 264*b*, and when the swinging lock 266 is in the locked position, an upwardly extending projection 264*a* on the swinging lock 266 is received in the recess 264*b* to hold the swinging lock 266 in the locked position and prevent opening of the gate 236.

When the swinging lock 266 is in the locked position, it is spaced vertically above the portion of the gate 236 adjacent the button 237, thereby allowing the swinging lock 266 to be pressed and deflected in spring-like fashion to separate the projection 264*a* on the swinging lock 266 from the recess 264*b* on the latch 270 and thereby allow the swinging lock 266 to be moved to the unlocked position so that the gate 236 is no longer retained against movement. Locking the swinging lock 266 similarly involves pressing the swinging lock 266 downwardly towards the top surface 238 and pivoting the swinging lock 236 to align the projection 264*a* of the swinging lock 236 with the recess 264*b* of the latch 270 and then releasing the swinging lock 236 to allow it to spring upwardly so that the projection 264*a* is received in the recess 264*b*.

In some embodiments, the cap 234 may include a second latch that is constructed similarly to the aforementioned latch 270 and can hold the swinging A in the unlocked position. The second latch may be located on the same side of the gate 236 as the pin 268 so that the swinging lock 266 does not interfere with the movement of the gate 236 between the open and closed positions.

Figure 11:
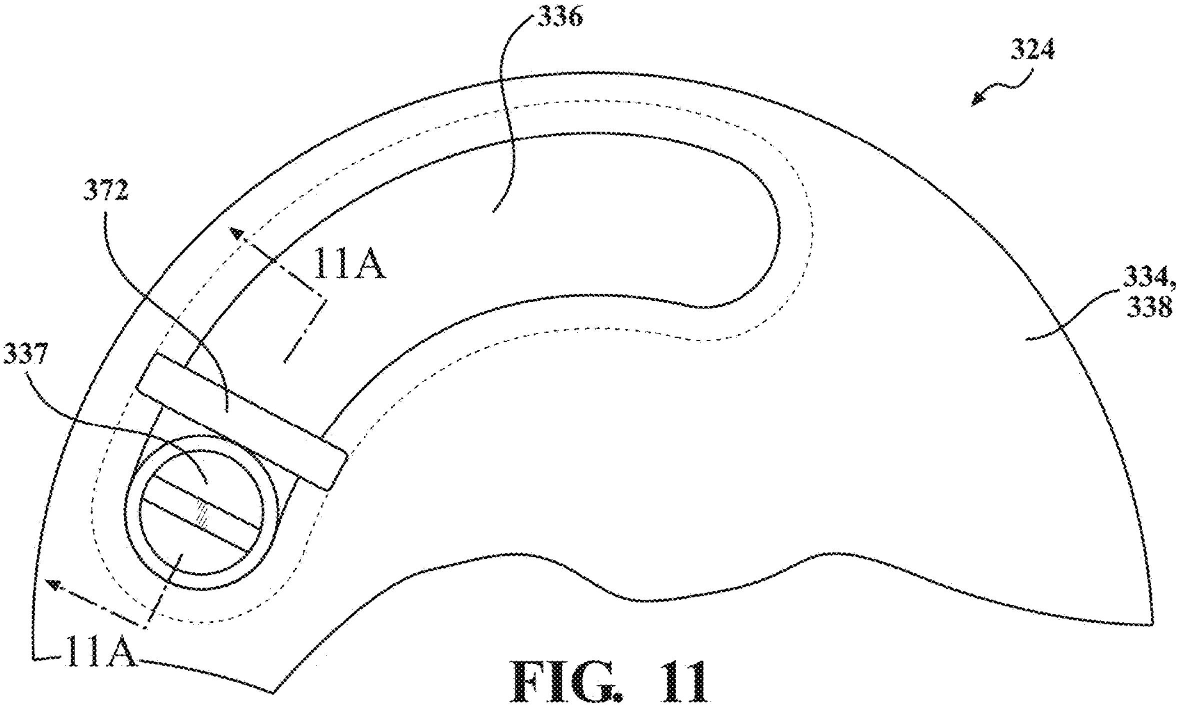
FIG. 11 is a top elevation view of an exemplary cap assembly including a fourth exemplary embodiment of the safety mechanism.
Figure 12A:
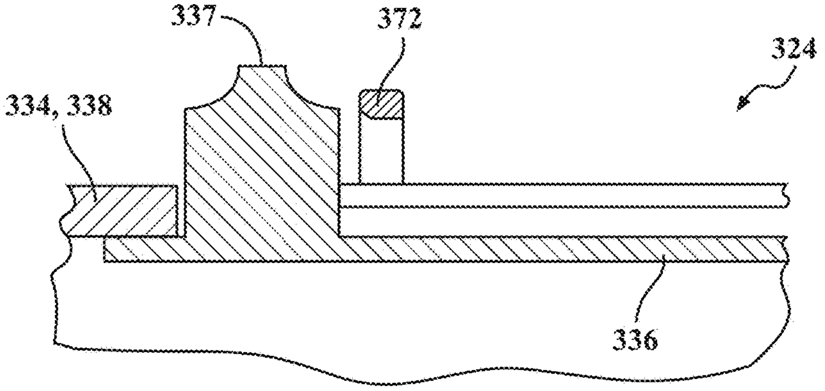
FIG. 12A is a cross-sectional view of a cap assembly that has the fourth exemplary embodiment of the safety mechanism and showing the gate in a closed position.
Figure 12B:
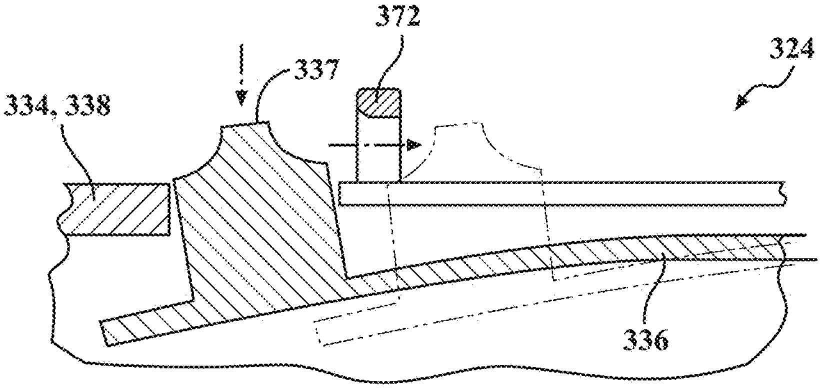
FIG. 12B is another cross-sectional view of the cap assembly that has the fourth exemplary embodiment of the safety mechanism and showing the gate being deflected so that it can be opened.

Referring now to FIGS. 11, 12A, and 12B, a fourth exemplary embodiment of the safety mechanism is shown with like numerals, separated by a prefix of "3," identifying like components with the embodiments described above. In this embodiment, a bridge 372, or some other restriction, extends over the opening and the gate 336. The bridge 372 is positioned such that it directly contacts the button 337 of the gate 336 when the gate 336 is in the closed position to capture (lock) the gate 336 in the closed position. The bridge 372 may be monolithic with the surrounding portions of the cap 334. In an example, the bridge 372 is elongate and fixed at each end to the cap on opposite sides of the opening. The bridge 372 is adjacent the end of the elongate opening whereat the gate 336 can close the opening and remote from the end of the elongate opening whereat the gate is positioned to uncover the opening. The bridge 372 can further include support pillars at each end to hold connecting a span that crosses the opening with the span being upraised from the top surface of the cap. This example provides a height beneath the span that the button 337 can travel to allow the gate 336 to move between open and close positions. In an example, the button 337 has a height such that its top is substantially equal to the span with the gate in its at rest position. In an example the button 337 ends above the span with the span in its at rest position. In an example, the elongate body of the gate 336 has a spring characteristic with its normal state as essentially planar and can be deflected downwardly upon force being applied to the end, e.g., at button 337. The gate 336 will return to its natural at-rest state when the force is no longer urging the end of the gate downwardly. In an example, downwardly refers to the direction toward the internal volume of the vial or toward the underside of the cap.

As illustrated in FIG. 12B, to open or close the gate 336, the button 337 of the gate 336 must be purposely and forcefully pressed downwardly so that the button 337 can traverse under the bridge 372. Once the button 337 has traversed the bridge 372 in either direction, the force can be released such that the gate 336 automatically springs upwardly to its resting state. As shown in FIG. 12A, when the gate 336 is in the closed position, the gate 336 is restricted in one direction by a front wall of the opening and in an opposite direction by the contact between the button 337 and the bridge 372.

As shown in FIGS. 12A and 12B, a lower surface of the bridge 372 may be chamfered to assist in deflecting the gate 336 downwardly so that it can be moved into the closed position.

Figure 13:
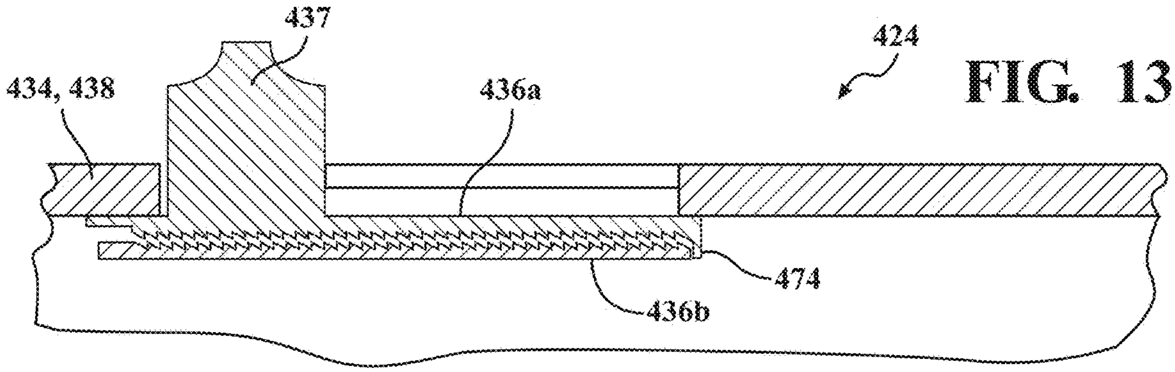
FIG. 13 is a cross-sectional view of a cap assembly having a fifth exemplary embodiment of the safety mechanism and showing both first and second portions of the gate in closed positions.
Figure 14:
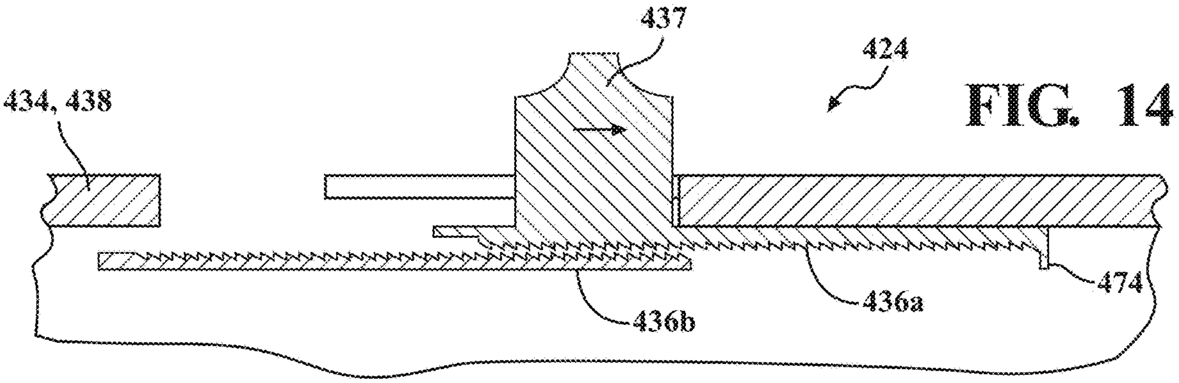
FIG. 14 is another cross-sectional view of the cap assembly with the fifth exemplary embodiment of the safety mechanism and showing a first portion of the gate in an open position and a second portion of the gate in a closed position.
Figure 15:
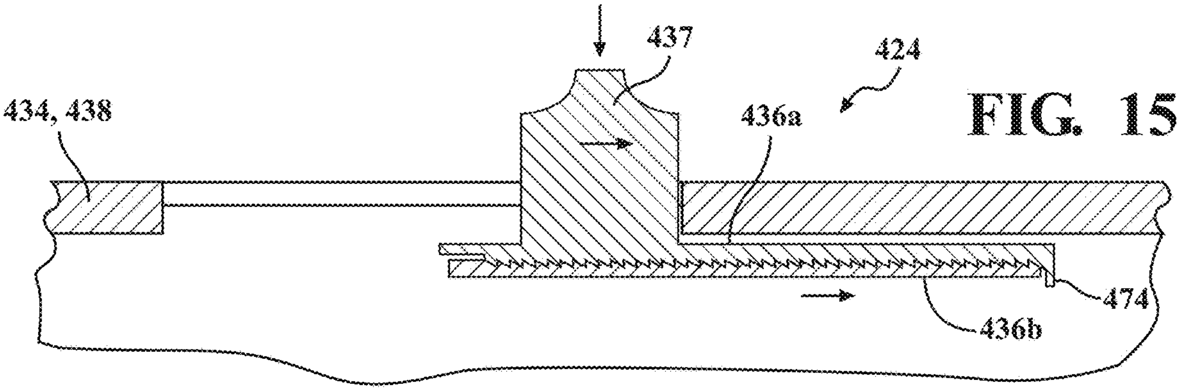
FIG. 15 is another cross-sectional view of the cap assembly with the fifth exemplary embodiment of the safety mechanism and showing both the first and second portions of the gate in their respective open positions.

Referring now to FIGS. 13-16, a fifth exemplary embodiment of the safety mechanism is shown with like numerals, separated by a prefix of "4," identifying like components with the embodiments described above. In this embodiment, rather than having just a single piece gate, the cap 434 includes an upper gate 436*a* and a lower gate 436*b* that are made as separate pieces from one another and that can each slide between respective open and closed positions. FIG. 13 shows both gates 436*a*, 436*b* in their closed positions; FIG. 15 shows both gates 436*a*, 436*b* in partially opened positions; and FIG. 14 shows the upper gate 436*a* in the its open position and the lower gate 436*b* in its closed position. As described in further detail below, this multi-gate design is advantageous because the lower gate 436*b* can only open upon a deliberate application of a downward force when opening the upper gate 436*a*. Thus, even if a child was able to open the upper gate 436*a* by sliding the upper gate 436*a* to its open position without the downward force or if the upper gate 436*a* were to be unintentionally moved to its open position, access to the medication inside of the receptacle would still be restricted as illustrated in FIG. 14.

A lower surface of the upper gate 436*a* is provided with a plurality of downwardly facing teeth with ramped surfaces facing in a closing direction and with either perpendicular or partially inverted surfaces facing in an opening direction. An upper surface of the lower gate 436*b* is provided with a corresponding set of teeth with the opposite arrangement, i.e., the ramped surfaces face in the opening direction, and the perpendicular or partially inverted surfaces face in the closing direction. As shown in FIG. 13, when the upper gate 436*a* is in a resting position, the teeth of the upper and lower gates 436*a*, 436*b* are spaced from one another such that, when the lower gate 436*b* is in its closed position, opening of the upper gate 436*a* without pressing down on it does not affect the lower gate 436*b*. In contrast, as shown in FIG. 15, when the button 437 of the upper gate 436*a* is pressed downwardly to engage the two sets of teeth with one another, movement to the upper gate 436*a* towards its open position also has the effect of moving the lower gate 436*b* towards its open position. Thus, the deliberate action of pressing down on the button 437 of the upper gate 436*a* when opening it is required to open the lower gate 436*b*.

Figure 16:
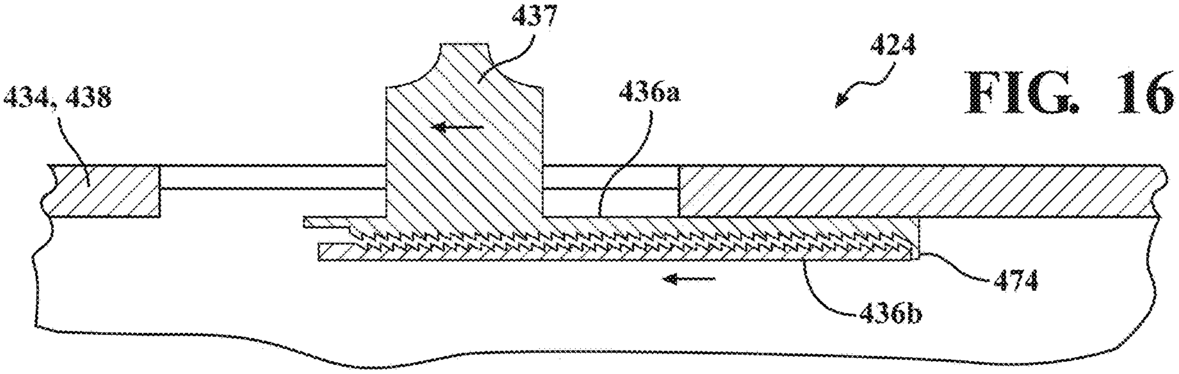
FIG. 16 is another cross-sectional view of the cap assembly with the fifth exemplary embodiment of the safety mechanism and showing a both the first and second portions of the gate being urged from the closed position to the open position.
Figure 17:
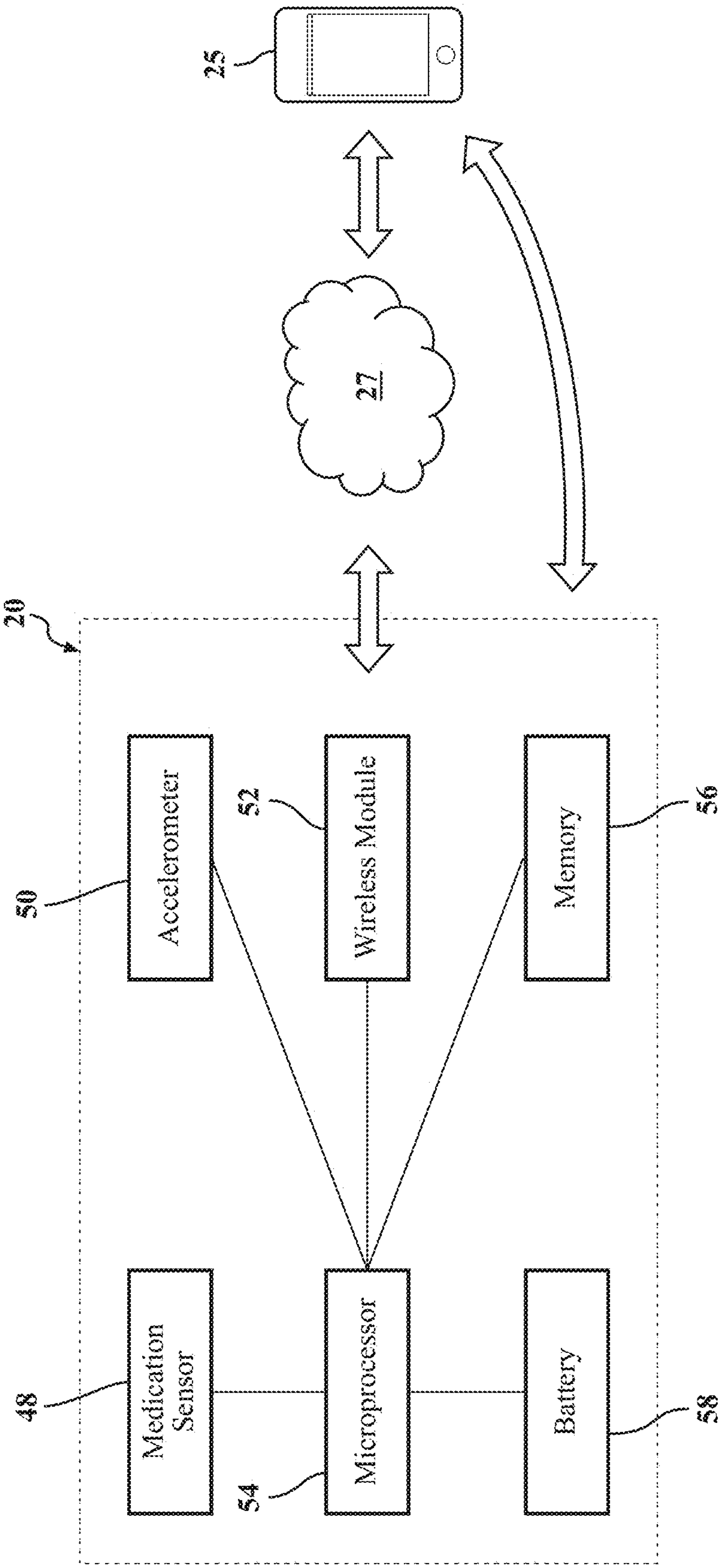

A back end of the upper gate 436*a* includes a downward projection 474 that can cooperate with a back edge of the lower gate 436*b* whether or not the downward force is applied to the upper gate 436*a*. Thus, as illustrated in FIG. 16, if the lower gate 436*b* is open, closing the upper gate 436*a*, with or without the downward force, always closes the lower gate 436*b*.

In various embodiments, the medications can be non-liquid medications such as individualized dose medications. The individual dose medications can be individually counted when they are dispensed from the receptacle past the medication sensor aligned with the passage. The medication, as in some embodiments, is a small, solid dosage form of a globular, ovoid, spheroid, or lenticular shape, containing one or more medical substances, supplemental substances, spices, or combinations thereof. The container and the cap are adapted to store these forms and prevent entry of environment into the interior of the medication container when closed by the cap assembly. The medication container is adapted to hold a plurality of the forms, e.g., ten, twenty, thirty, sixty, ninety, or multiples thereof.

The medications are herein referred to as pills; however, it should be appreciated that other types of solid medications (such as tablets, gel caps, capsules or the like, e.g., non-liquid medicines) may be employed. The container can store these other types of non-liquid medications therein. The container includes devices, sensors and circuitry that can sense and track entry and exiting of these types of medications, e.g., size, weight, reflectivity and the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A cap assembly for a container, comprising:
- a cap body that is configured to be attached with a receptacle, the cap body an exterior surface with a side wall and a top wall that faces away from the receptacle, the cap body having a passage therethrough from an inlet to an outlet, and the passage opening to the top wall of the cap body so that items can be inserted into and removed from an interior space of the receptacle through the top wall of the cap body;
- a gate operably coupled with the cap body and able to move between a closed position which restricts movement of items from exiting the cap body through the outlet and an open position which allows items to move out through the outlet;
- a lock operably interacting with the gate to hold the gate in the closed position and upon an unlocking action allowing the gate to move to the open position from the closed position in response to an application of an unlocking force on a portion of the gate to disengage the lock;
- a sensor in the cap body at the passage to detect movement of an item through the passage and output an electrical signal; and
- a memory that is configured to store item passage data based on the electrical signal from the sensor.

2. The cap assembly of claim 1, wherein the top wall and the inner wall define a chamber in which the memory is held.

3. The cap assembly of claim 2, wherein the chamber holds a processor operably connected to the sensor and the memory and a wireless module configured to communicate with an external device to transmit item passage data.

4. The cap assembly of claim 1, wherein the sensor is mounted to the inner wall.

5. The cap assembly of claim 1, wherein the sensor is mounted to sense outwardly toward an outer wall of the cap body across the passage.

6. The cap assembly of claim 1, wherein the gate is cantilevered, and wherein the unlocking force includes a downward force acting on the gate.

7. The cap assembly of claim 1, wherein the sensor is mounted to sense outwardly toward an outer wall of the cap body across the passage.

8. The cap assembly of claim 1, wherein the sensor is at the outlet and contactlessly senses an item moving past the sensor at the outlet, the sensor being configured to sense items inserted into the interior space of the receptacle when the receptacle is in an upright orientation, and the sensor being configured to sense items dispensed out of the receptacle when the receptacle is in an inverted orientation.

9. The cap assembly of claim 1, wherein the passage extends linearly between the inlet and the outlet.

10. A cap assembly for a container, comprising:
- a cap body that is configured to be attached with a receptacle, the cap body having a passage therethrough from an inlet to an outlet;
- a gate cantileveredly, operably coupled with the cap body, the gate movable between a closed position which restricts movement of items from exiting the cap body through the outlet and an open position which allows items to move out through the outlet;
- a lock operably interacting with the gate to hold the gate in the closed position and upon an unlocking action allowing the gate to move to the open position from the closed position in response to an application of an unlocking force on a portion of the gate to disengage the lock, wherein the unlocking action including a downwardly directed force on the gate;

a sensor in the cap body at the passage to contactlessly detect movement of an item through the outlet and output an electrical signal;

a memory that is configured to store item passage data based on the electrical signal from the sensor;

processing circuitry operably connected to the sensor and the memory; and a wireless module configured to communicate with an external device to transmit item passage data.

11. The cap assembly of claim 10, wherein the gate includes an upwardly extending button and wherein the gate receives the downwardly directed force to cause the gate to resiliently deflect to release the lock.

12. The cap assembly of claim 11, wherein the lock includes at least one projection on the gate or the cap body and at least one detent on the other of the gate and the cap body, and wherein the downwardly directed force deflects the gate to disengage the at least one projection from the at least one detent.

13. The cap assembly of claim 12, wherein the at least one detent is at the outlet and the at least one projection is on the gate, and wherein with the gate in the closed position, the at least one projection on the gate is received in the detent at the outlet.

14. The cap assembly of claim 12, wherein the cap body includes a top wall and an inner wall, wherein the outlet is defined by the top wall and the inlet defined by the inner wall, wherein the at least one detent is in the top wall and the at least one projection is on the gate, and wherein, with the gate in the closed position, the at least one projection on the gate is received in the detent at the top wall.

15. A cap assembly for a container, comprising:

a cap body that is configured to be attached with a receptacle, the cap body an exterior surface with a side wall and a top wall that faces away from the receptacle, the cap body having a passage therethrough from an inlet to an outlet, and the passage opening to the top wall of the cap body so that items can be inserted into and removed from the receptacle through the top wall of the cap body;

a gate operably coupled with the cap body, the gate movable in a gate direction between a closed position which restricts movement of items from exiting the cap body through the outlet and an open position which allows items to move out through the outlet;

a lock operably interacting with the gate to hold the gate in the closed position and upon an unlocking action allowing the gate to move to the open position from the closed position in response to an application of an unlocking force on a portion of the gate to disengage the lock, wherein the unlocking force is applied in a direction different to the gate direction;

a plurality of sensors in the cap body at the passage to contactlessly detect movement of an item through the outlet and output an electrical signal, wherein at least two of the plurality of sensors are arranged at angles relative to each other;

a memory that is configured to store item passage data based on the electrical signal from the plurality of sensors;

processing circuitry operably connected to the plurality of sensors and the memory; and a wireless module configured to communicate with an external device to transmit item passage data.

16. The cap assembly of claim 15, wherein the cap body includes a an inner wall with the top wall and inner wall defining a chamber; wherein the outlet defined by the top wall and the inlet defined by the inner wall; wherein the chamber holds the processing circuitry, the memory, and the wireless module; and wherein at least one of the plurality of sensors is mounted to the inner wall.

17. The cap assembly of claim 15, wherein at least one of the plurality of sensors is mounted to sense outwardly toward an outer wall of the cap body across the passage.

18. The cap assembly of claim 15, wherein the gate is cantilevered, and wherein the unlocking force includes a downward force acting on a free end of the gate.

19. The cap assembly of claim 15, wherein the cap body includes a top wall and an inner wall, and wherein the gate slides between the closed position and the open position within the cap body generally parallel to one of the top wall or the inner wall.

20. The cap assembly of claim 15, wherein the outlet is arcuate and the gate is arcuate to close the outlet in the closed position.

* * * * *